(No Model.)  3 Sheets—Sheet 1.

J. G. & G. W. SMITH.
ADDING MACHINE.

No. 400,714.  Patented Apr. 2, 1889.

Witnesses:
M. Fowler
R. W. Bishop.

Inventors
John G. Smith and
George W. Smith,
By their Attorneys
C. A. Snowden

N. PETERS, Photo-Lithographer, Washington, D. C.

(No Model.) 3 Sheets—Sheet 2.

J. G. & G. W. SMITH.
ADDING MACHINE.

No. 400,714. Patented Apr. 2, 1889.

Witnesses
H. Fowler.
R. W. Bishop.

Inventors
John G. Smith and
George W. Smith
By their Attorneys (No Model.)
J. G. & G. W. SMITH.
ADDING MACHINE.
No. 400,714. Patented Apr. 2, 1889.
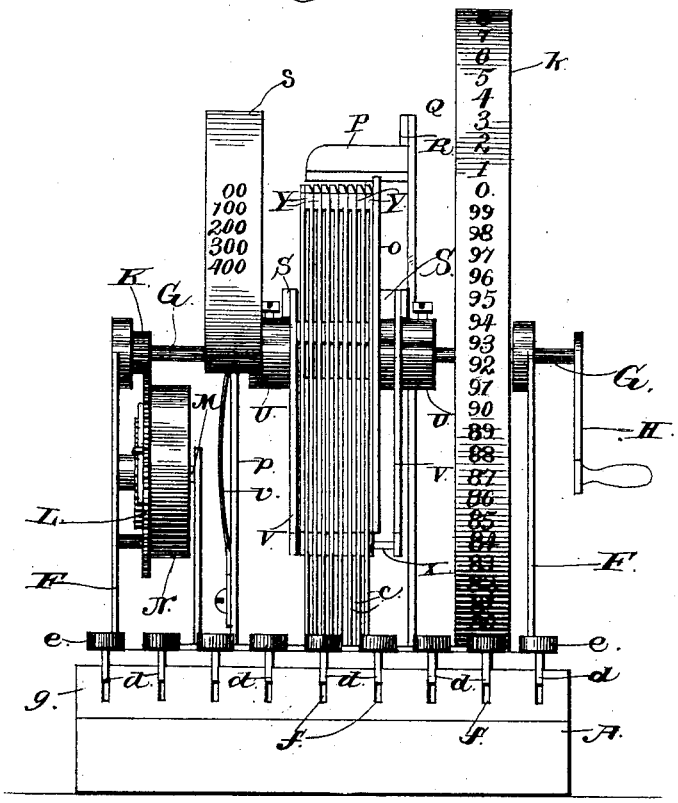

UNITED STATES PATENT OFFICE.

JOHN G. SMITH AND GEORGE W. SMITH, OF ALBANY, MISSOURI.

ADDING-MACHINE.

SPECIFICATION forming part of Letters Patent No. 400,714, dated April 2, 1889.

Application filed October 26, 1888. Serial No. 289,216. (No model.)

*To all whom it may concern:*

Be it known that we, JOHN G. SMITH and GEORGE W. SMITH, citizens of the United States, residing at Albany, in the county of Gentry and State of Missouri, have invented new and useful Improvements in Adding-Machines, of which the following is a specification.

Our invention relates to improvements in adding-machines; and it consists in certain novel features hereinafter described and claimed.

Figure 1:
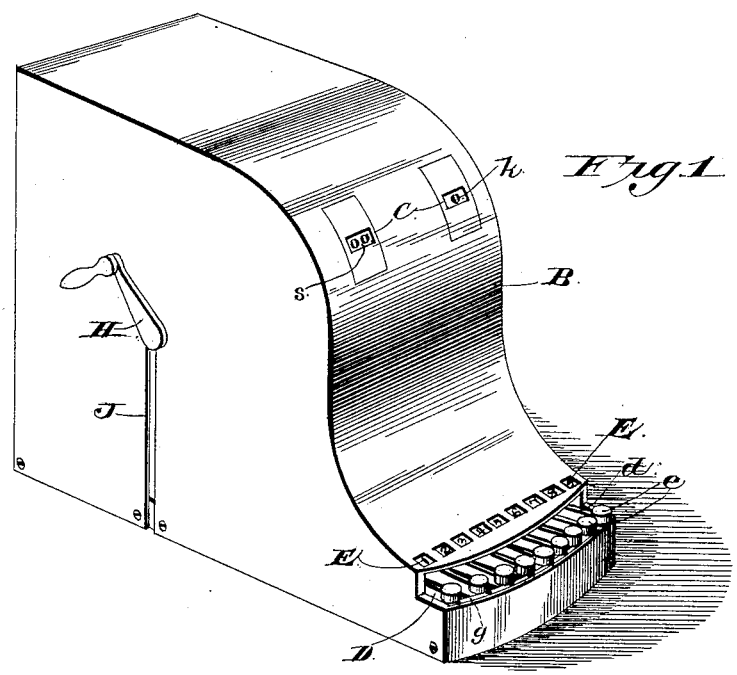
Figure 2:
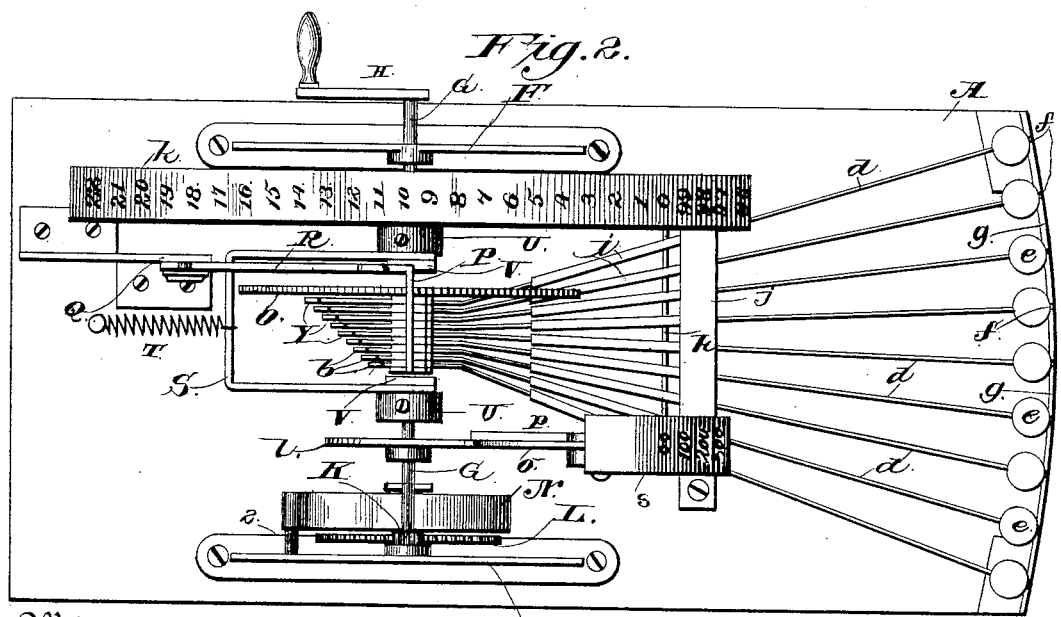
Figure 3:
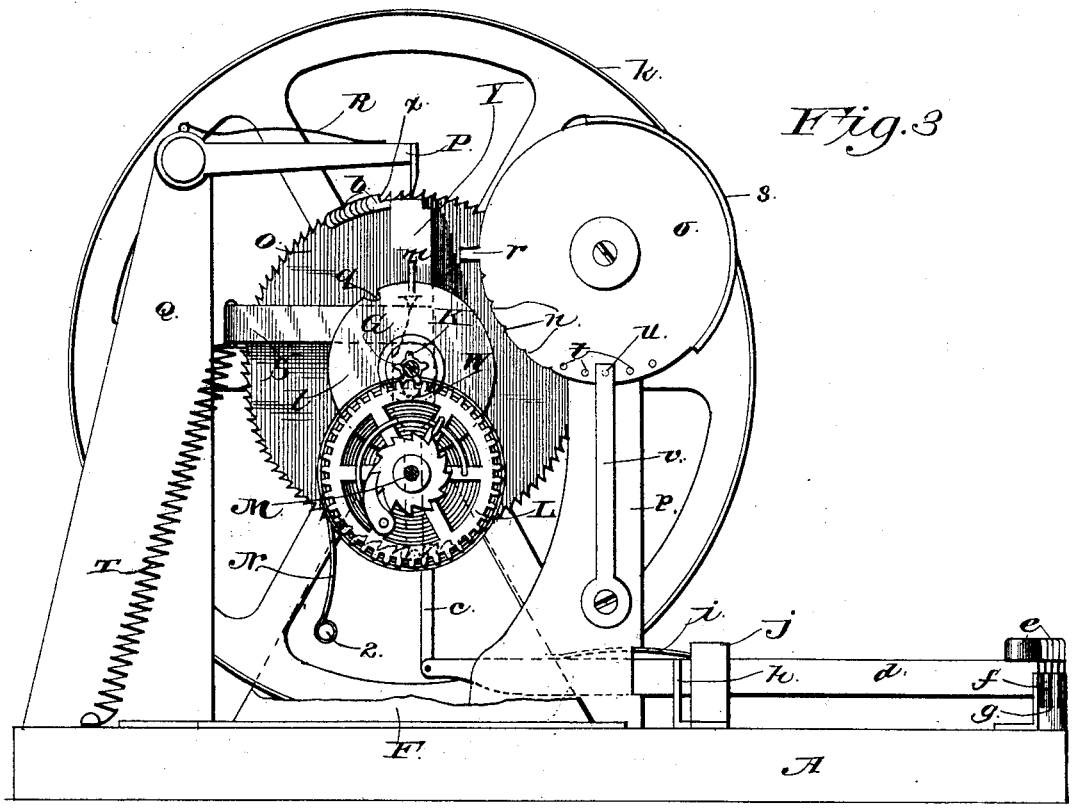
Figure 4:
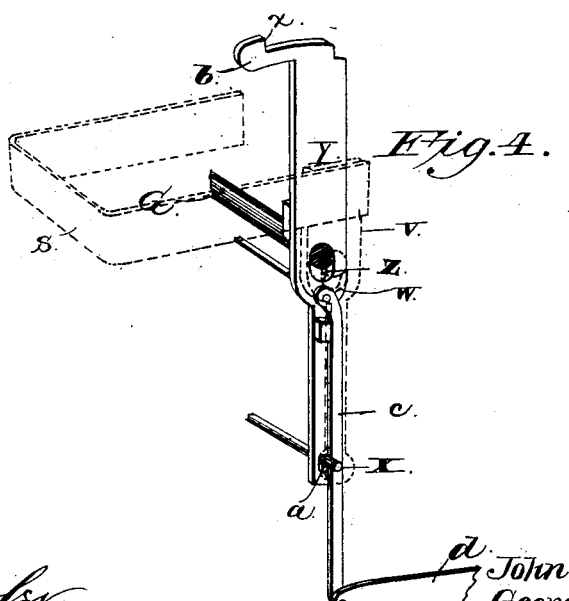

In the accompanying drawings, Figure 1 is a perspective view of our improved device. Fig. 2 is a plan view with the casing removed. Fig. 3 is a side view with a part broken away. Fig. 4 is a detail view showing the connection between the operating-levers and the trip-levers. Fig. 5 is a front elevation with the casing removed.

A designates the base-plate, of suitable dimensions, having a casing, B, secured to its edges and projecting upward therefrom. The casing is provided in its front side with the transverse slots C C, through which the results obtained by adding columns of figures are displayed, as will be hereinafter described, and the casing is further provided at its lower front end with a transverse slot, D, through which the knobs on the front ends of the operating-levers *d* project upward in position to be struck by the fingers of the operator. Above this slot D the casing is provided with a series of openings, E, through which are displayed numerals from 1 to 9, inclusive, indicating the lever to be operated in order to add any desired number. The numerals are arranged in succession from the right to the left side of the machine, as clearly shown, and are printed or stamped on a strip of any suitable material secured to the inner side of the casing so as to extend across the openings.

On the upper side of the base-plate, at the opposite edges of the same, and near the rear end thereof, we erect the standards F F, in the upper ends of which the main shaft G is journaled, the said shaft being extended beyond the side of one of the standards and provided with a crank, H, said crank H being arranged outside the casing, as shown. In order that the casing may be readily removed to permit repairs to be made to the operating mechanism, we removably secure it to the base-plate by small screws, and it is provided in its side with the vertical slot J, so that it can be slipped downward over the main shaft.

The main shaft is provided at one end with a small pinion, K, which meshes with a larger pinion, L, on the stub-shaft M, projecting from the standard F and having one end of a volute spring, N, secured thereto, the other end of said spring being secured to a pin or stud, 2, projecting from the standard F. This spring is wound by rotating the main shaft through the medium of the crank-arm H, consequently imparting motion to the stub-shaft, so as to draw on the spring through the pinions L and K. In the operation of the device the tension of this spring serves to rotate the driving-shaft G in a contrary direction to that given it by the crank, as will be hereinafter more fully set forth.

O designates a ratchet-wheel, which is rigidly secured to the main shaft G at about the the center of the same, and is engaged at the highest point of its periphery by a pawl, P, pivoted to the upper end of the standard Q, erected on the base-plate at the rear end of the same, as shown, the said pawl being held normally in engagement with the ratchet-wheel by a spring, R, secured to the upper end of the standard and bearing on the upper edge of the pawl.

S designates a yoke, which is loosely mounted on the main shaft and passes around the rear portion of the ratchet-wheel O, and is held normally in a horizontal position by a spring, T, having its opposite ends secured, respectively, to the base-plate and the rear portion of the yoke. The yoke is prevented from moving laterally by the collars U, through which set-screws are inserted to bind against the main shaft and thereby secure the said collars thereto, as shown in Figs. 2 and 5. The yoke is provided at its front ends with the depending arms V, having longitudinal slots W in their upper ends, through which the shaft G passes, so that the said yoke is supported on the said shaft and is capable of moving thereon in a vertical plane. The lower ends of the arms V are connected by a transverse pin or rod, X. This transverse pin or rod X engages the lower teeth of the ratchet-wheel O in the operation of the device, as will be presently more fully referred to.

Y Y designate a series of trip-levers, which are arranged to one side of the ratchet-wheel, and are provided with longitudinal slots Z, through which the shaft G passes, the upper ends of the slots resting on the shaft, so that the said levers are supported thereby. The lower ends of these levers are mounted on the transverse bar X, and are provided with longitudinal slots $a$, through which the said rod passes. The upper ends of the levers are provided with integral rearwardly-extending arcs $b$, as shown most clearly in Figs. 2, 3, and 4, the said arcs increasing successively in length from the right-hand side of the series toward the left, or that side which is adjacent to the ratchet-wheel, each succeeding arc being greater in length than the preceding one by a distance equal to the space between two adjacent teeth of the ratchet-wheel, so that the right-hand trip-lever Y, when operated, as hereinafter described, will allow the said ratchet-wheel to rotate a distance equal to one of the spaces between its teeth, while the left-hand trip-lever, or the one next to the said wheel, when raised, will allow the said wheel to rotate a distance equal to nine of said spaces. Each of these trip-levers Y is connected to the upper end of a connecting-rod, $c$, the lower end of said connecting-rod being pivoted to the rear end of one of the operating-levers $d$, which levers $d$ are provided with the operating-knobs $e$ at the front end and play in vertical notches $f$ in a curved guide-bar, $g$, secured to the front end of the base-plate. The operating-levers are fulcrumed upon a fulcrum-plate, $h$, secured transversely to the base-plate, and their rear ends are held normally depressed by the leaf-springs $i$, secured at their front ends to a transverse bar, $j$, secured to the base-plate and extending transversely over the operating-levers, the rear ends of the springs bearing upon the said levers in rear of their fulcrums.

$k$ designates the indicating-wheel secured rigidly on the main shaft and having displayed upon its periphery the numerals running from 0 to 99 in successive order, the space occupied by each one of said numerals corresponding to one space between the adjacent teeth of the ratchet-wheel O. This indicator-wheel is arranged near one side of the machine, and the numerals are displayed through the slot C in the casing near the right-hand side of the same.

A disk, $l$, is secured upon the main shaft G, near the left-hand end of the same, and is provided in its edge with a single tooth, $m$, (see Fig. 3,) which is adapted to engage one of a series of notches, $n$, in the edge of a disk, $o$, journaled upon the upper end of a standard, $p$, projecting from the base-plate. The disk $l$ is further provided with a notch, $q$, one side of which is adapted to engage a tooth, $r$, on the edge of the disk $o$ to return the said disk to its normal position. The said disk $o$ has an indicator-plate, $s$, secured upon a portion of its edge and carrying the numerals indicating hundreds, the said plate moving in rear of the left-hand slot C in the casing and displaying the numerals through the same.

The disk $o$ is provided in its side near its edge with a series of notches or recesses, $t$, which are engaged by a pin or lug, $u$, on the upper end of a leaf-spring, $v$, secured at its lower end to the side of the standard $p$. The detent formed by this spring serves to prevent retrograde movement of the said disk, as will be readily understood.

In operation the machine is arranged so that the indicator-wheel $k$ and the indicator-plate $s$ both display the character indicating 0 or nothing through the slots C in the casing. The operator then depresses the front ends of the operating-levers $d$, denoting the numbers to be added, thereby raising the rear end of said levers and causing the connecting-rods extending upward from said rear ends to raise the corresponding trip-levers Y until the lower ends of the slots Z in the same contact with the main shaft G and the transverse rod X. The upper end of the trip-lever is thus caused to disengage the pawl P from the ratchet-wheel by carrying the arc $b$ against the pawl and thereby lifting the same, when the volute spring will be free to actuate the said shaft, so as to rotate the same, and move the indicator-wheel, so as to display the numeral indicating the sum of the added figures through the right-hand slot C in the casing.

When the operating-lever $d$ is depressed at its front end, the rear end is raised, as before stated, and the trip-lever lifted. The trip-lever is raised in a vertical line until the lower ends of the slots Z $a$ contact with the main shaft and with the transverse rod X, respectively, when the said rod X will be raised into engagement with the lower teeth of the ratchet-wheel O, and the yoke S will be caused to rotate or swing upward and forward, the bar X serving to carry the lower ends of the trip-levers rearward, consequently causing the upper ends of the same to swing forward at the same rate of speed as the ratchet-wheel by reason of the said rod X engaging the said ratchet-wheel. The forward motion of the ratchet-wheel O and the trip-levers Y is limited by stops $x$ at the rear ends of the arcs of the said levers contacting with the front end of the pawl P.

From the foregoing description, taken in connection with the accompanying drawings, it will be seen that the main shaft is rotated by the volute spring, and the rate and length of each rotation is governed by the operating-levers. Depressing the lever indicating the figure 1 allows the ratchet-wheel to rotate only a distance equal to one of the spaces between its adjacent teeth, while depressing the lever indicating the figure 5 will allow it to rotate five times as far, and so on. When the stop at the rear end of the arc on the trip-lever contacts with the pawl, the forward motion of the upper end of the trip-lever will be stopped. The pressure on the operating-lever is then relieved, and the yoke and the said lever are at once returned to their normal position by reason of the springs acting thereon, as will be readily understood. When the motion of the trip-levers is arrested, the motion of the ratchet-wheel, and consequently of the main shaft and the indicator-wheel, will be simultaneously arrested, as the rod X is in engagement with the lower portion of the ratchet-wheel. When the pressure on the operating-lever is relieved, the trip-lever is at once lowered and the pawl falls into engagement with the ratchet-wheel to prevent movement of the same. When the figures have been added so as to sum up a total of one hundred, the disk $l$ will have completed one rotation and the tooth of the same will engage the first notch of the disk $o$ and will move the same forward, so as to display the number 100 through the left-hand slot C in the casing. When the volute spring has been completely unwound, the crank H is rotated, so as to wind up the said spring and at the same time return the indicator-wheel $k$ and the disk $o$, carrying the indicator-plate $s$, to their initial or zero position, it being understood, of course, that the said spring is of the proper length to remain wound, or partially so, until the machine has been operated to its fullest extent.

From the foregoing description it will be seen that we have provided a very simple and compactly-arranged machine by which long columns of figures can be very rapidly and at the same time accurately added together.

Having thus described our invention, what we claim, and desire to secure by Letters Patent, is—

1. In an adding-machine, the combination of the spring-actuated main shaft, the indicator-wheel carried thereby, the ratchet-wheel rigidly secured thereto, the pawl engaging said wheel to prevent movement of the shaft, a series of trip-levers adapted to disengage the pawl from the ratchet-wheel and to hold it disengaged therefrom for periods of different lengths, and a series of operating-levers adapted to actuate the trip-levers, as set forth.

2. The combination of the main shaft, the indicator-wheel carried thereby, the spring adapted to actuate said shaft, the ratchet-wheel mounted on the main shaft, the pawl engaging the ratchet-wheel, a series of trip-levers loosely mounted on the main shaft and provided at their upper ends with arcs of varying lengths bearing against the pawl and adapted to disengage it from the ratchet-wheel, and a series of operating-levers adapted to actuate said trip-levers, as set forth.

3. The combination of the main shaft, the spring to actuate the same, the indicator-wheel carried thereby, the ratchet-wheel rigidly secured to said shaft, the pawl engaging the ratchet-wheel, the trip-levers loosely mounted on the shaft and adapted to disengage the pawl from the ratchet-wheel, the yoke loosely mounted on the main shaft, the transverse rod connecting said yoke to the lower ends of the trip-levers and engaging the ratchet-wheel, a spring to hold said yoke in its normal position, and a series of operating-levers adapted to actuate the trip-levers, as set forth.

4. The combination of the main shaft having a crank at one end, a volute spring connected by gearing to the other end of the shaft and adapted to actuate the same, the ratchet-wheel rigidly mounted on the shaft, the pawl engaging said ratchet-wheel, a series of trip-levers adapted to disengage the pawl from the ratchet-wheel and thereby control the rotation of the shaft, and a series of operating-levers adapted to actuate the trip-levers, as set forth.

5. The combination of the spring-actuated main shaft, the indicator-wheel carried thereby, the ratchet-wheel rigidly secured thereon, the pawl engaging the ratchet-wheel, the trip-levers loosely mounted on the main shaft and having longitudinal slots in their lower ends, the yoke loosely mounted on the main shaft and having depending arms, the rod secured in said arms, passing through the slots in the trip-levers, and engaging the ratchet-wheel, and the operating-levers connected with the trip-levers to actuate the same, as set forth.

6. The combination of the spring-actuated main shaft, the indicator-wheel carried thereby, the ratchet-wheel secured rigidly thereon, the pawl engaging the ratchet-wheel, the series of trip-levers loosely mounted on the main shaft and having arcs at their upper ends of varying lengths, the said arcs having the stops $x$ and bearing against the pawl, the yoke loosely mounted on the main shaft, the rod carried by the yoke, passing through the trip-levers, and engaging the ratchet-wheel, and the operating-levers connected with the trip-levers, as set forth.

7. The combination of the spring-actuated main shaft, the indicator-wheel carried thereby, the ratchet-wheel secured on the shaft, the standard Q, the pawl pivoted thereon and engaging the ratchet-wheel, the trip-levers mounted on the main shaft and bearing against the pawl, the yoke loosely mounted on the shaft and connected with the trip-levers, the spring secured to the yoke to hold it normally lowered, the operating-levers, and the connecting-rods having their lower ends pivoted to the operating-levers and their upper ends pivoted to the trip-levers at about the centers of the same, as set forth.

8. The combination of the main shaft, mechanism for rotating the same, the disk secured on said shaft, having a single notch in its edge and a single tooth projecting from its edge, the standard in front of the main shaft, the disk journaled on said standard and having a series of notches in its edge and a single tooth projecting from its edge, and having a series of recesses in its side, the indicator-plate secured to the edge of the last-mentioned disk, and the spring secured to the standard and provided with a pin engaging one of the recesses in the side of the disk, as set forth.

In testimony that we claim the foregoing as our own we have hereto affixed our signatures in presence of two witnesses.

JOHN G. SMITH.
GEORGE W. SMITH.

Witnesses:
J. H. SAMPSON,
T. M. HUMPHREY.